United States Patent [19]
Nakamura

[11] Patent Number: 5,619,197
[45] Date of Patent: Apr. 8, 1997

[54] SIGNAL ENCODING AND DECODING SYSTEM ALLOWING ADDING OF SIGNALS IN A FORM OF FREQUENCY SAMPLE SEQUENCE UPON DECODING

[75] Inventor: Shin-ichi Nakamura, Sagamihara, Japan

[73] Assignee: Kabushiki Kaisha Toshiba, Kanagawa-ken, Japan

[21] Appl. No.: 348,827

[22] Filed: Nov. 29, 1994

[30] Foreign Application Priority Data

Mar. 16, 1994 [JP] Japan .................................... 6-046008

[51] Int. Cl.$^6$ .............................. G11B 20/00; G11B 7/00
[52] U.S. Cl. ............................... 341/50; 341/61; 348/423
[58] Field of Search ................................. 341/50, 61, 81; 358/146, 364; 348/423

[56] References Cited

U.S. PATENT DOCUMENTS

| | | | |
|---|---|---|---|
| 5,012,352 | 4/1991 | Yoshimura et al. ..................... | 358/343 |
| 5,130,815 | 7/1992 | Silverman et al. ..................... | 358/335 |
| 5,274,740 | 12/1993 | Davis et al. . | |
| 5,508,949 | 4/1996 | Konstantinides ........................ | 364/725 |

FOREIGN PATENT DOCUMENTS

| | | |
|---|---|---|
| 0245904 | 11/1987 | European Pat. Off. . |
| 0372155 | 6/1990 | European Pat. Off. . |
| 0381807 | 8/1990 | European Pat. Off. . |
| 0521487 | 7/1993 | European Pat. Off. . |
| 0577329 | 1/1994 | European Pat. Off. . |

OTHER PUBLICATIONS

Princen et al., "Analysis/Synthesis Filter Bank Design Based on Time Domain Aliasing Cancellation," IEEE Transactions on Acoustics, Speech, and Signal Processing, vol. ASSP-34, No. 5, Oct. 1986, pp. 1153–1161.

Digital Video Compression on Personal Computers: Algorithms and Technologies, vol. 2187, 7 Feb. 1994, SPIE, San Jose, California, pp. 260–273, XP 000571198.

"The MPEG systems coding specification," Signal Processing: Image Communication, vol. 4, 1992, Elsevier Science Publishers B.V., pp. 153–159, XP 000273161.

Patent Abstracts of Japan, vol. 16, No. 303, 3 Jul. 1992, JP-A-04 082433, 16 Mar. 1992.

Patent Abstracts of Japan, vol. 14, No. 187, 16 Apr. 1990, JP-A-02 035886, 6 Feb. 1990.

*Primary Examiner*—Howard L. Williams
*Assistant Examiner*—Peguy JeanPierre
*Attorney, Agent, or Firm*—Cushman Darby & Cushman Intellectual Property Group of Pillsbury Madison & Sutro LLP

[57] ABSTRACT

In a signal compressing and encoding apparatus, a plurality of A/D converters sample input audio signals synchronously to produce time sample sequences. An audio encoding circuit transforms the time sample sequences in time/frequency by a frame interval to produce frequency sample sequences. The frequency sample sequences are compressed, encoded and formatted into a frame structure to generate audio bit streams. The audio bit streams are multiplexed by a formatter into a multiplexed bit stream. On the other hand, in a compressed signal decoding circuit, a quantization decoder decodes the frequency sample sequences for each bit stream separated and extracted selectively out of the multiplexed bit stream. Adding the result the decoded frequency sample sequences produces a summing result. The summing result is then transformed in frequency/time by a frequency/time mapping to produce the original time sample sequences.

26 Claims, 13 Drawing Sheets

BIT STREAM #1 OUTPUT SAMPLE SEQUENCE

BIT STREAM #2 OUTPUT SAMPLE SEQUENCE

MIXED OUTPUT SAMPLE SEQUENCE

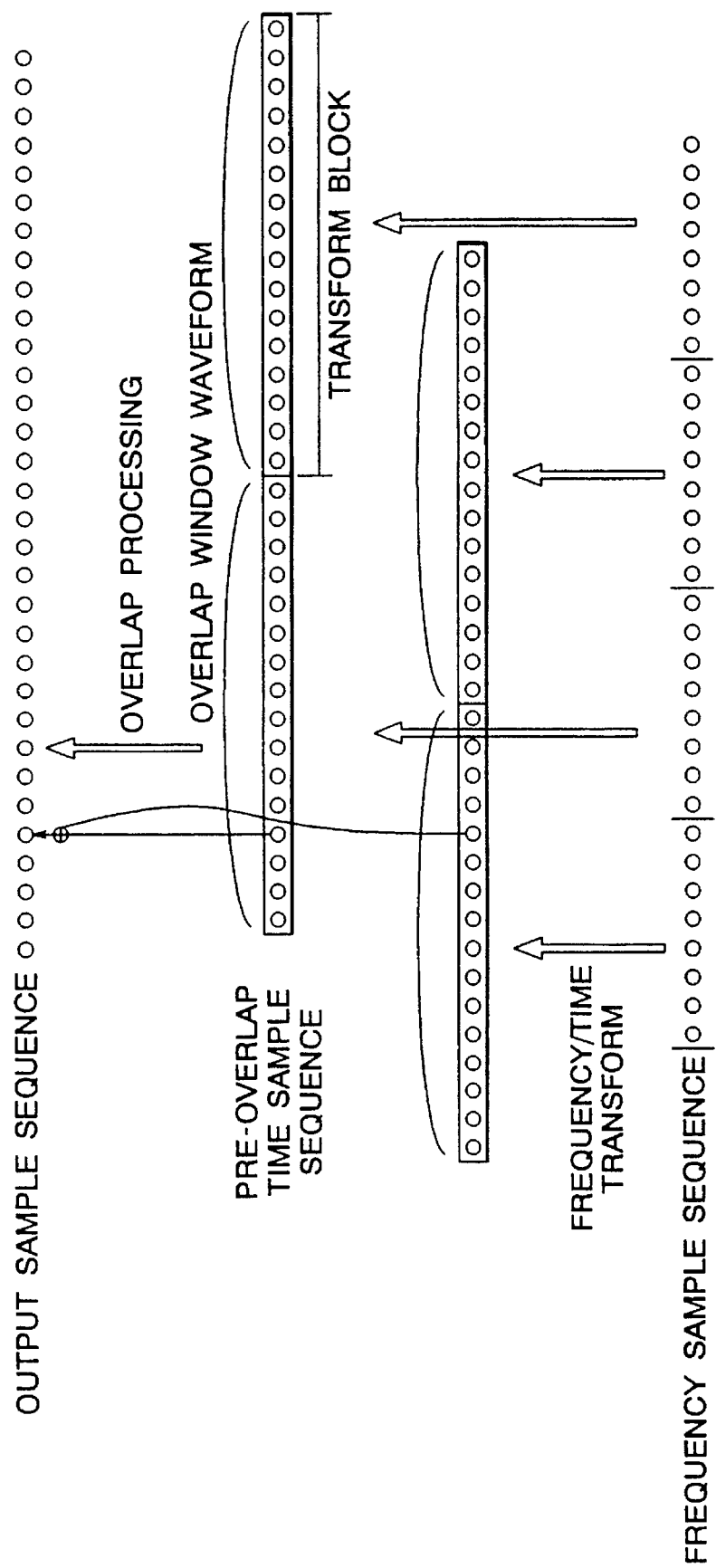

SIGNAL ENCODING AND DECODING SYSTEM ALLOWING ADDING OF SIGNALS IN A FORM OF FREQUENCY SAMPLE SEQUENCE UPON DECODING

BACKGROUND OF THE INVENTION

1. Field of the Invention

The present invention relates to a signal compression and encoding apparatus for compressing and multiplexing, for example, audio or video signals and a compressed signal decoding apparatus for decoding the compressed and multiplexed audio or video signals. The present invention also relates to a system including these apparatuses.

2. Description of the Related Art

To transmit/record digitized audio, acoustic signals requires a large volume of data, so that a huge transmission or storage capacity is required. Therefore, there has been a strong demand for a technique for compressing such data.

Typically the human perceptual system does not receive all stimulation equally, so that only a part of stimulation record at one time is received while the remaining parts are not perceived. Discrimination of the perceived component and non-perceived component is known to be made effectively in frequency areas. With this in mind, a compression algorithm of high efficiency using this principle has been developed. More specifically, a time sample sequence is converted into a frequency sample sequence by using an orthogonal transform technique. The current compression method compresses data in this frequency sample sequence. Examples of the transform in time/frequency include Discrete Cosine Transform (DCT) and Modified Discrete Cosine Transform (MDCT). The DCT algorithm is similar to Fast Fourier Transform (FFT) that converts data into sets of frequencies. In addition, subband filters where a large number of bandpass filters are aligned are also known.

One technique for compressing and encoding audio data is developed by the Moving Pictures Experts Group (MPEG), International Standards Organization (ISO) standard for compressing video (ISO/IEC-11172-3). FIG. 11 is a simple block diagram associated with this MPEG encoding. Input signals are audio digital signals sampled typically at sampling frequencies of 48 kHz, 44.1 kHz, or 32 kHz. Output can be selected for bit-streams of from 32 kbps to 448 kbps. Three layers, Layers I, II, and III, are defined according to compression efficiencies. Layers I and II based on the same fundamental algorithm are now described.

Input is supplied to a block 1 called mapping and then supplied to a subband filter group which segments a frequency region into thirty-two samples. The subband filter output is subjected to stripping to strip one sample by thirty-two samples. The subband filter ensures that the number of samples before passing through the subband filter is the same as that after passing therethrough without any change of the number of samples (i.e., the samples are critically sampled) and that the original time sample sequence can be de-formatted completely by this inverse transform. Accordingly, it can be understood that the input signal is transformed into a frequency sample sequence by the certain number of time samples in the approach using the subband filters, as in the case using the orthogonal transform technique.

As the mapping block 1, the input signal is supplied to a psychoacoustical model block 2. In this block 2, a frequency spectrum is obtained out of the input sample sequence by means of transformation in time/frequency (e.g., FFT) based on a certain frame independently of the mapping block 1. A length of this frame corresponds to 12 blocks (Layer I) or 36 blocks (Layer II) of the transform block of the above mentioned subband filter. In various schemes without using the subband filter, an orthogonal transform results in a large output. Accordingly, a frequency spectrum of this output may be used for calculation of the psychoacoustical model.

A signal to mask ratio (SMR) is then obtained between a signal level (S) of each subband, calculated out of the frequency spectrum by using the psychoacoustical model, and a mask level (M) which is not recognized acoustically due to masking effects. A quantization and coding block 3 resolves the output sample of the mapping into a product of the signal level (S) and a sample value (D(i)), namely, OUTPUT SAMPLE=S * D(i).

The signal level (S) is referred to as a scale factor indicative of the level into which a sample of the maximum value is classified, within the subband of the frame. The frequency samples are quantized with a bit number obtained according to SMR into D'(i). The bit number is allocated to the frequency sample, and this process is referred to as a bit allocation. A quantization noise (N) or an artifact generated as a result of quantization will not be recognized even with the smaller bit number if this noise is lower than the masking level. The data is thus compressed.

The bit allocation, the scale factor, and the sample data are formatted into a bit stream sequence having a frame structure by a frame packing block 4. At the decoding side, this bit stream is received and frame synchronization is achieved by a frame unpack block 5. The bit allocation, scale factor, and sample data are separated from each other for extraction. The frequency sample sequence is then reproduced by a quantization decoding block 6 and the time sample sequence is reconstituted by an inverse mapping block 7. As a result, a reproduced acoustic signal is obtained.

FIG. 12 shows an exemplified structure of a bit stream. A head of one frame is a header 21 having information about frame synchronization codes and other information regarding, for example, mode. This is followed by the bit allocation 22, the scale factor 23, and the sample data 24. A supplementary data may follow thereafter. One frame comprises one or more blocks for a time-to-frequency transform.

With a system for transmitting and storing audio signals associated with video images, the acoustic and audio signals should be in the form of two or more channels when two or more different languages are used. More specifically, the acoustic signal common for all languages and channels for respective languages are transmitted or stored. At the receiving or reproducing side, the common channel and one language are selected, which are summed and produced. Such "multi-channeled" acoustic signal may be compressed into bit streams by using one of following two techniques.

The first method is the one to compress all channels into a single bit stream. For MPEG, this approach has been realized in a new process of standardization as MPEG 2.

This method is, however, disadvantageous when the number of languages is increased. A bit rate of the bit stream (bit per second; bps) is increased to ensure that the sound has a significant quality. The bit rate (bps) of the compressed bit stream has certain limitations in a case where compression of two channels is fundamental as in MPEG. Such limitations are required to avoid elongated time for frame synchronization even with one audio frame has the increased number of bits in a two-channel mode. The limitation also ensures that the number of input buffer registers is not changed with the increased bit rate of the compressed bit stream during decoding operation. As apparent from the above, the standardized bit stream limits the number of channels available.

The second method is to construct a plurality of bit stream systems with signals on two or more channels being separate bit streams. This allows a system for many languages (channels) with the standard bit stream. In this event, only the bit stream on the desired channel is decoded at the decoding side. It is, however, necessary to decode separately the bit streams on the common acoustic channel and the channel for the selected language, increasing the amount of processing by two.

FIG. 13 shows an example of such multi-channel system. In this event, each audio input may be monaural or be on multiple channels i.e., in stereo. In this system, a number of audio input signals are first subjected to audio compression/encoding by a number of audio encoders 31, 32, 33, 34. Bit streams are each multiplexed by a bit stream multiplexer/formatter 41 into a system bit stream. A video signal may be multiplexed, if the system include video signals. In addition, system information may also be multiplexed that is required for synchronization between the video and audio signals.

At the reproduction side, the video and audio bit streams and the system information are separated from each other by a demultiplexer 42. Processing of audio is made by means of selecting a desired bit stream from the reproduced audio bit streams and decoding it by using audio decoders 43 and 44. If a plurality of audio bit streams are selected, the audio decoders 43 and 44 decode compressed audio bit streams separately and independently. The decoded audio signals are mixed by a mixer/summer 45 and then produced.

As described above, conventionally, when a plurality of bit streams are formed for input signals of plural systems, such as audio and acoustic signals to multiplex them, the multiplexed bit streams should each be decoded by using separate systems upon reproduction thereof. It is thus necessary to provide a plurality of decoding circuits having the same structure and function, disadvantageously increasing the scale and the dimension of the resultant circuit.

SUMMARY OF THE INVENTION

The present invention solves such problems and is directed to provide a signal compression and encoding apparatus, a compressed signal decoding apparatus, and a combined system of these apparatus that allow the gathering frequency-to-time transform units together as one unit in a circuit structure of decoding system, thereby reducing a scale of the circuit when signals on plural input lines are each subjected to time-to-frequency transform, compressed, and multiplexed.

In the present invention, input signals on a plurality of input lines are each synchronized and sampled in a sampling device to produce a time sample sequence. Next, each time sample sequence obtained by the sampling means is provided to an encoding means. The received time sample sequence is transformed in time/frequency while being synchronized by a predetermined time interval to produce frequency sample sequences. The frequency sample sequences are compressed and bit streams are produced that have a predetermined format including the compressed frequency sample sequence. The above mentioned plurality of bit streams are multiplexed by a multiplexer.

A plurality of bit streams are selectively separated and extracted from the multiplexed bit stream by a separating means. The frequency sample sequence is de-formatted by a de-formatting means for each of these individual bit streams. The de-formatted frequency samples are summed with each other, the summing result of which is transformed in frequency/time to produce the time sample sequence.

More specifically, in the present invention, audio signals on plural input lines are sampled while being synchronized with each other to form a multiplexed bit stream that is frame-synchronized between audio on the individual input lines, which permits, upon decoding, summing in the frequency sample sequences as compared to the conventional technique of summing of the time sample sequences. As a result, the frequency-to-time transform requires only one input line, allowing a simplified circuit structure.

BRIEF DESCRIPTION OF THE DRAWINGS

These and other objects, features and advantages of the present invention will become more apparent in light of the following detailed description of the preferred embodiments as illustrated in the accompanying drawings in which:

FIG. 4 shows an example where the transform block is overlapped with an adjacent block by 50%;

DESCRIPTION OF THE PREFERRED EMBODIMENTS

Figure 1:
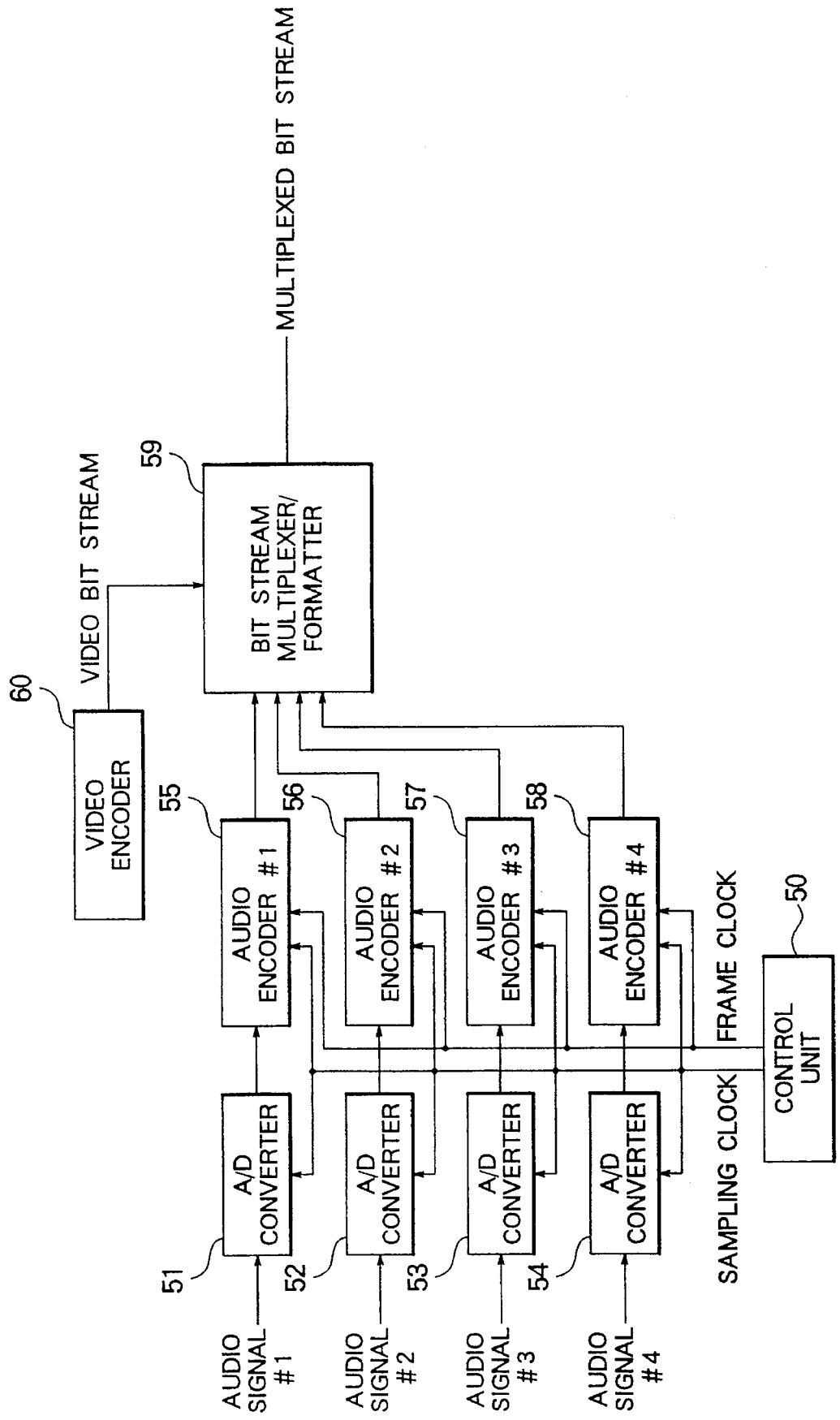
FIG. 1 is a block diagram illustrating a structure of a signal compressing and encoding apparatus according to one embodiment of the present invention.

Embodiments of the present invention are described below with reference to the drawing.

FIG. 1 is a block diagram illustrating a structure of a signal compressing and encoding apparatus in a multiplexed bit stream transmission/reproduction system according to one embodiment of the present invention.

In this figure, 51, 52, 53, and 54 are A/D converters that receive audio input signals #1, #2, #3, and #4, respectively, on plural input lines to convert them into digital data. The audio input signals #1, #2, #3, and #4 may be music, effects sound, multilingual voice sounds, stereo sound, or monaural sound in media such as movies. 55, 56, 57, and 58 are audio encoders that are connected with the outputs of the A/D converters 51, 52, 53, and 54, respectively.

The A/D converters 51–54 and the audio encoders 55–58 are supplied with a common sampling clock from a control unit 50. In addition, the audio encoders 55–58 are supplied with a frame clock from the control unit 50. The A/D converters 51–54 and the audio encoders 55–58 each produces an audio bit stream including frequency sample sequences for the audio input signals #1–#4 and sends them to a bit stream multiplexer/formatter 59.

More specifically, each of the A/D converters 51–54 samples the input audio signal according to the timing of the above mentioned common sampling clock, and supplies data to the corresponding audio encoding unit 55–58 as the time sample sequence. Each of the audio encoding units 55–58 transforms in time/frequency the time sample sequences supplied from the corresponding A/D converters 51–54 by the frame intervals according to the above mentioned common frame clock to obtain the frequency sample sequences. The frequency sample sequences are compressed and encoded, and are then formatted into frame structures, thereby producing the audio bit streams.

The bit stream multiplexer/formatter 59 multiplexes the audio bit streams produced by the audio encoders 55–58 and video bit streams taken from a video encoder 60 to produce a multiplexed bit stream.

Next, a compressed signal decoding apparatus in the multiplexed bit stream transmission/reproduction system according to this embodiment of the present invention is described.

Figure 2:
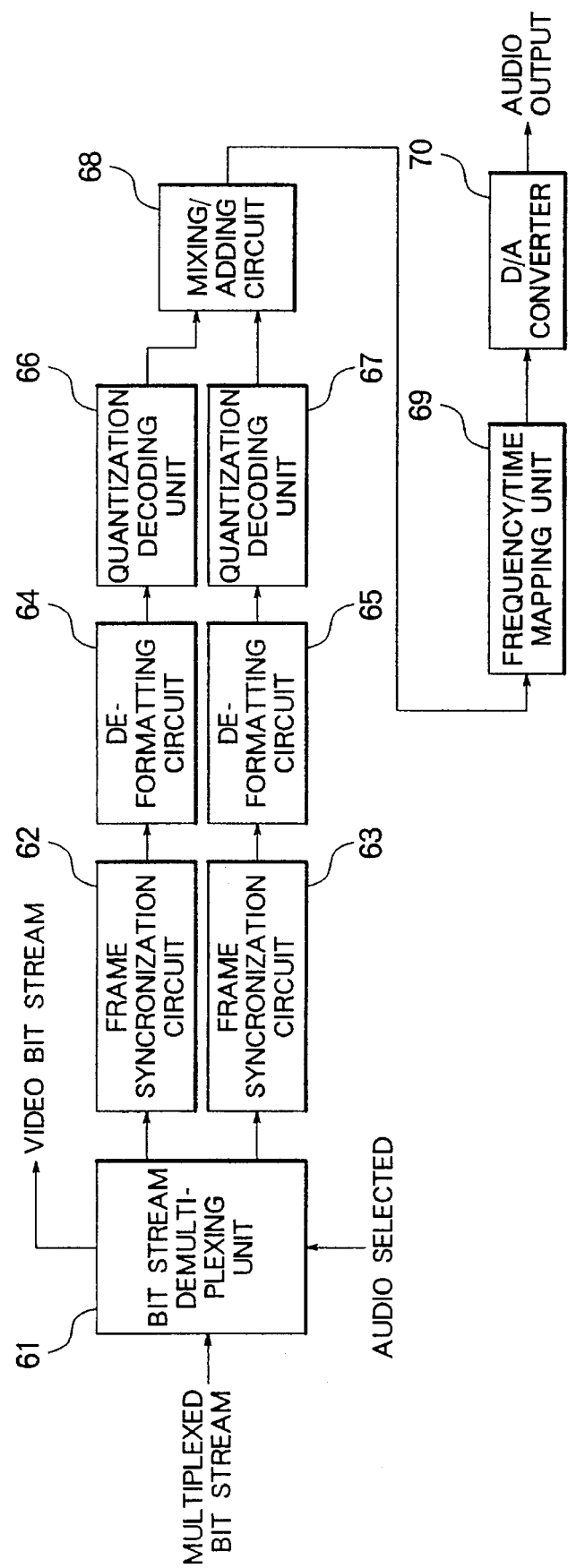
FIG. 2 is a block diagram illustrating a structure of a compressed signal decoding apparatus according to one embodiment of the present invention.

FIG. 2 is a block diagram showing a structure of this compressed signal decoding apparatus. In this figure, 61 is a bit stream demultiplexing circuit 61 that receives the multiplexed bit streams to demultiplex the same into bit streams for individual input lines. This bit stream demultiplexing circuit 61 separates and extracts two or more desired audio bit streams out of the multiplexed audio bit stream. 62 and 63 are frame synchronization circuits where each audio bit stream separated and extracted by the bit stream demultiplexing circuit 61 is subjected to frame synchronization and is then supplied to processing sections in a subsequent stage. 64 and 65 are de-formatting circuits where each frame-synchronized audio bit stream is subjected to analysis on each bit and is separated into the bit allocation, the scale factor, and the frequency sample sequences. 66 and 67 are quantization decoding units 66 that decode the frequency sample sequences of the individual audio bit streams. 68 is a common mixing/adding circuit 68. Each decoded frequency sample sequence is added for frequency samples at corresponding locations by this mixing/adding circuit 68 on one input line. The frequency sample sequence added on one input line is then supplied to a frequency/time mapping unit 69 and is converted into a time sample sequence for output. Thereafter, the time sample sequence is converted into an analog signal through a D/A converter 70 and output as an audio output signal.

Figure 3A:
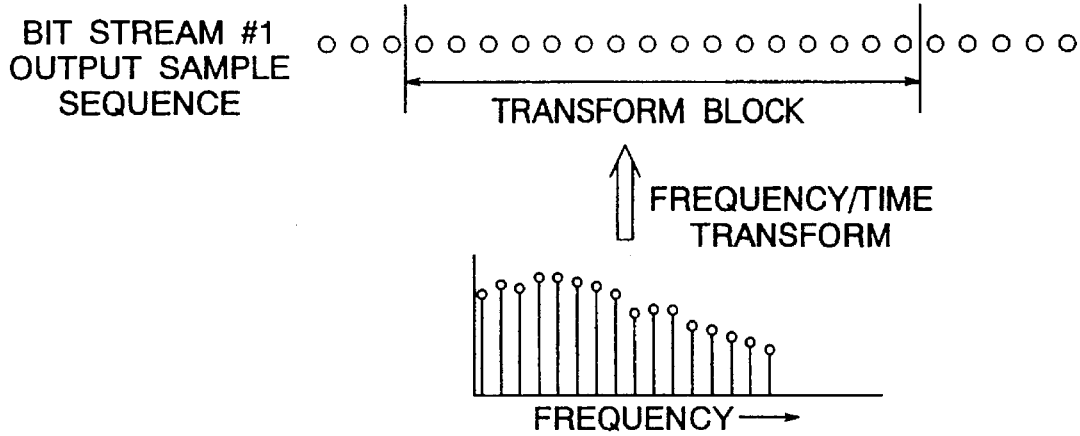
FIG. 3A is a view illustrating a relationship between a frequency spectrum and a time sample sequence in a frequency sample sequence of one bit stream.
Figure 3B:
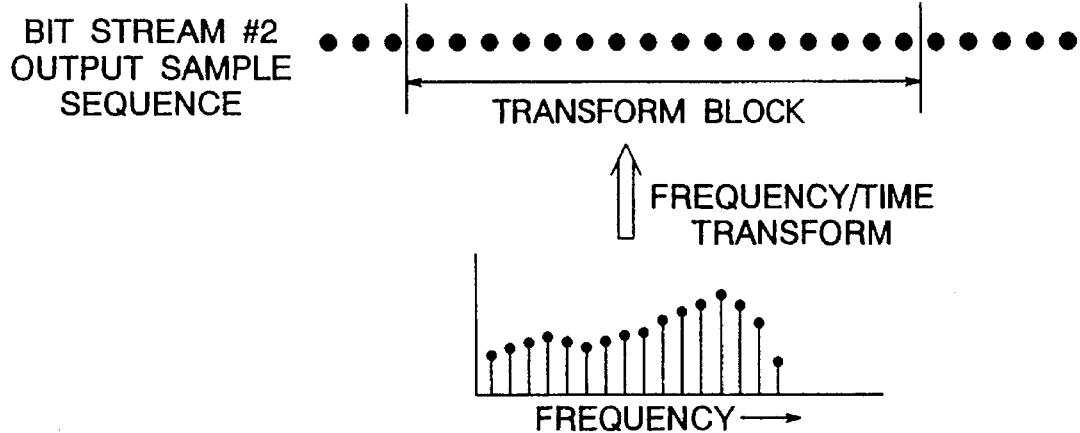
FIG. 3B is a view illustrating a relationship between a frequency spectrum and a time sample sequence in a frequency sample sequence of one bit stream.
Figure 3C:
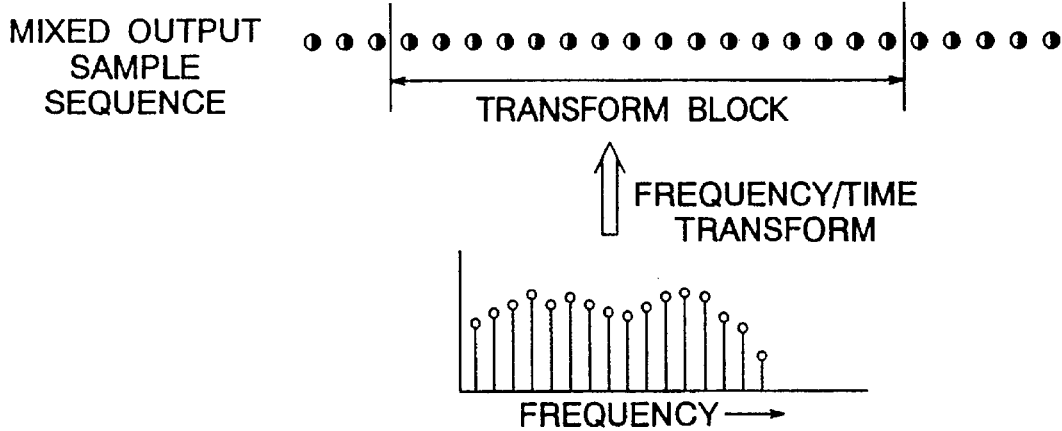
FIG. 3C is a view illustrating a relationship between a frequency spectrum and a time sample sequence in a frequency sample sequence of a added bit stream.

FIGS. 3A–C illustrate the relationship of a frequency spectrum and a time sample sequence. FIGS. 3A and 3B illustrate a process for transforming frequency sample sequences consisting of different bit streams into time sample sequences by a certain transformation block. On the other hand, FIG. 3C illustrates process of transforming a summing result of the frequency sample sequences in FIGS. 3A and 3B into a time sample sequence by a certain transformation block.

As mentioned above, the sum of the two or more frequency sample sequences can be transformed in frequency/time to obtain the original time sample sequence. This means that the sum of the frequency sample sequences is equivalent to the time sample sequence. The reason of this is described now.

The orthogonal transform and the inverse transform are generally expressed as follows:

$$X(m) = \sum_{n=0}^{N-1} k_m x(n) C_m^n, \quad (1)$$

$$x(n) = \sum_{n=0}^{N-1} k_m X(m) C_m^n, \quad (2)$$

where $x(n)$ represents an n-th time sample,
$X(m)$ represents an m-th frequency sample,
$C_m^n$ represents a core of the orthogonal transform, or an orthogonal transform coefficient, $$m = 0, \ldots, N-1$$
$$k_m = 1/2^{1/2} \quad m = 0,$$
$$= 1 \quad m \neq 0.$$

The equation (2) represents the frequency-to-time transform. Let the frequency sample sequences of the bit stream be $X(m)$ and $Y(m)$, an output sample $z(n)$ can be given by:

$$\begin{aligned} z(n) &= \sum_{n=0}^{N-1} k_m \{(aX(m) + bY(m)\} C_m^n \\ &= \sum_{n=0}^{N-1} k_m X(m) C_m^n + \sum_{n=0}^{N-1} k_m X(m) C_m^n \\ &= ax(n) + by(n) \end{aligned}$$

where a and b are summing coefficients. Accordingly, the sum of the frequency sample sequences is equivalent to the time sample sequence.

For DCT, these equations are described in, for example, K. R. Rao and P. Yip, "Image Encoding Technique—DCT and International Standardization of It", Ohm Corporation.

According to this embodiment, the audio signals on plural input lines are sampled in a synchronous manner and a multiplexed bit stream is constructed with the audio signals for individual input lines in frame synchronization relation. As a result, the audio signals can be added upon decoding and reproduction in the form of the frequency sample sequences, which otherwise was made in the form of the time sample sequence in conventional arts. This requires only one input line for the frequency-to-time transform, resulting in a simplified circuit structure. In addition, the number of processing steps can be reduced when the above mentioned processing is achieved by software using a digital signal processor or the like.

In FIGS. 3A–3C, a transform block may be overlapped with an adjacent block along the time axis for a case, for example, of the MDCT and the subband filters. FIG. 4 shows an example where the transform block is overlapped with an adjacent block by 50%. In this event, a window coefficient is multiplied with each frequency sample sequence. These frequency sample sequences are added together for an overlapping time. This frequency-to-time transform provides the time samples as twice the number as the frequency samples. However, the number of the samples becomes one-half as a result of the overlap adding processing. Accordingly, the number of the output samples become equal to that of the frequency samples. The present invention can thus be applied equally to this case.

A principle of the MDCT is described in, for example, "Analysis/Synthesis Filter Bank Design Based on Time Domain Aliasing Cancellation" (IEEE Transaction on Acoustics, Speech, and Signal Processing: Vol. ASSP-34, No. 5, October 1986, pages 1153 to 1161).

Figure 5:
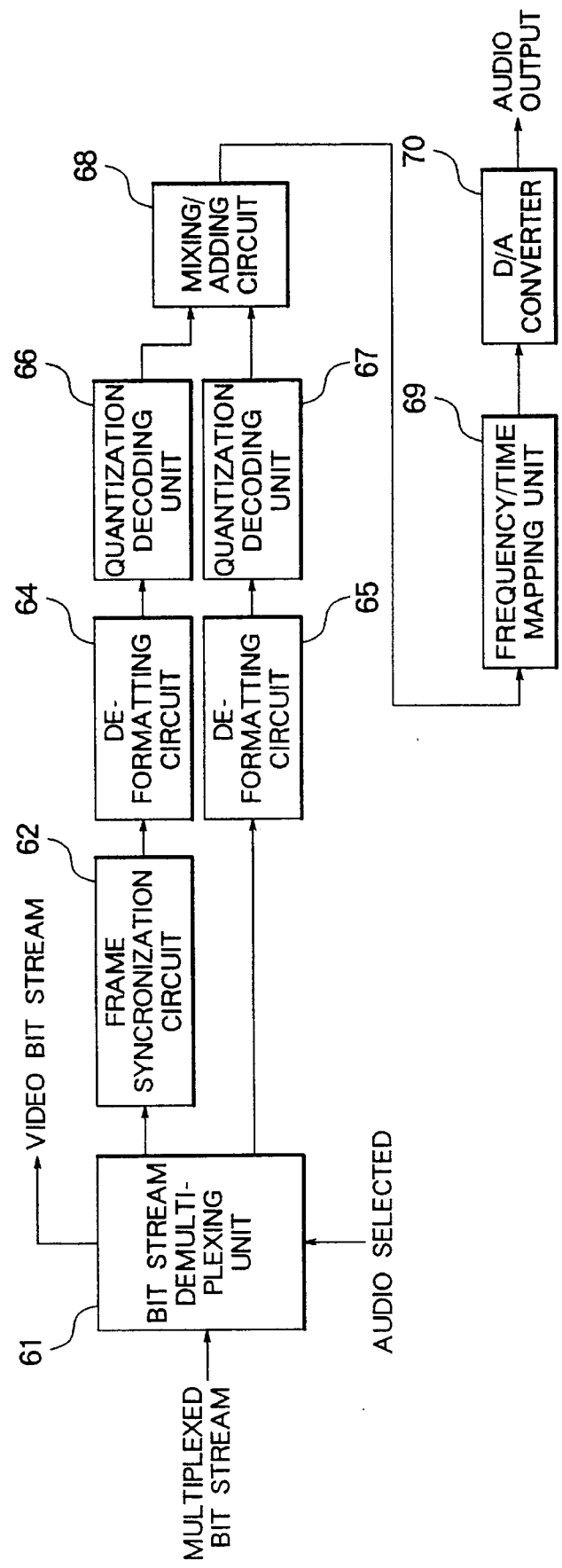
FIG. 5 is a circuit block diagram of a reproduction system for use in describing another embodiment of the present invention.

While this embodiment has thus been described in conjunction with the case where the frame synchronization is achieved for each audio bit stream, the frame synchronization may be achieved for at least one audio bit stream as shown in FIG. 5.

Figure 6:
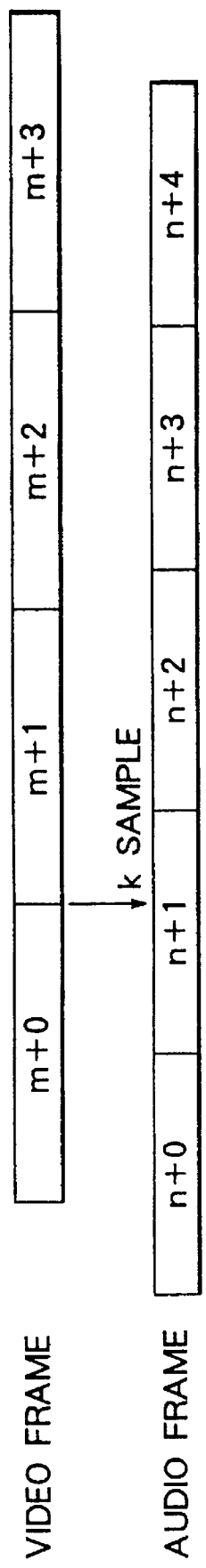
FIG. 6 is a view for use in describing and illustrating an asynchronous relation between a video frame and an audio frame.

Next, a yet another embodiment of the present invention is described. The video frames and the audio frames are naturally asynchronous with each other as shown in FIG. 6. With this respect, this embodiment constructs the data such that the audio frames on a plurality of input lines are each in a synchronous relation and the audio and video frames are also in a synchronous relation.

Figure 7:
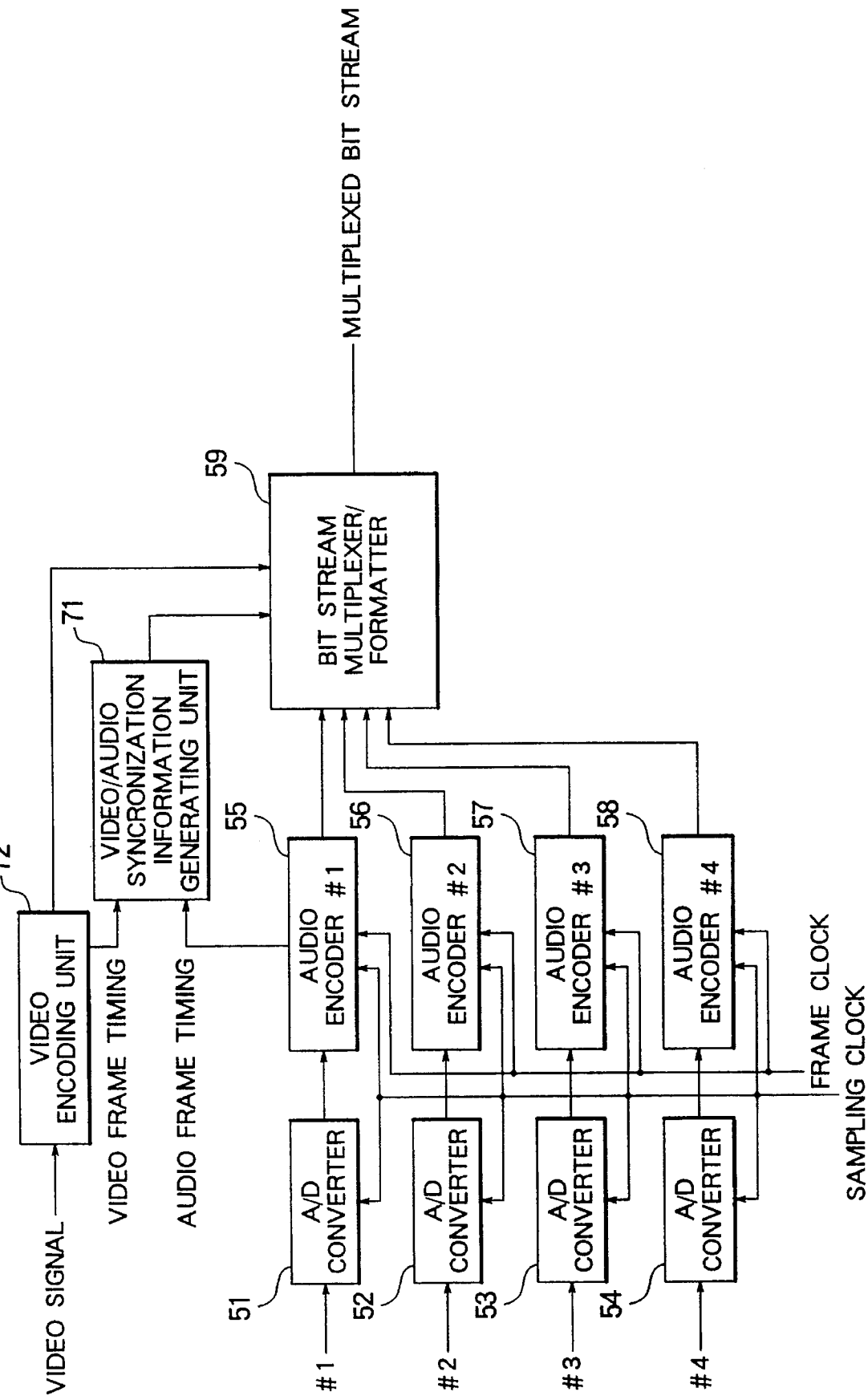
FIG. 7 is a block diagram illustrating a structure of a signal compression and encoding apparatus according to another embodiment of the present invention.

FIG. 7 is a block diagram illustrating a structure of a signal compression and encoding apparatus of this embodiment. In this figure, like reference numerals indicate like components and parts as in FIG. 1 and a detailed description thereof will be omitted. The signal compression and encoding apparatus in this embodiment is similar to the one described in FIG. 1 except that a video/audio synchronization information generating unit 71 is added. The video/audio synchronization information generating unit 71 is generates synchronization information for use in synchronizing the audio and video bit streams upon reproduction at a timing of the audio frames supplied from a predetermined audio coding unit (such as 55) as well as a timing of the video frames supplied from the video encoding unit 72. The video/audio synchronization information generating unit 71 supplies the synchronization information to the bit stream multiplexer/formatter 59. The synchronization information is further multiplexed into the multiplexed bit stream. This video/audio synchronization information is associated with a frame number of the audio signal to be reproduced at a given frame number of the video signal and with a sample number indicative of a position in the audio frame in question corresponding to an edge of the video frame.

Conventionally, it is necessary for producing video/audio synchronization information for each of the audio bit streams to achieve synchronization of the audio signals with the video signal by using the video/audio synchronization information because the audio bit streams in one input line are not in a synchronous relation with those in other input line. On the other hand, in the present embodiment, the audio bit streams in the individual input lines are in the synchronous relation with each other. The video/audio synchronization information is required to be generated only for one audio signal formed out of plural audio signals. Accordingly, the circuit required for this can be simplified.

Figure 8:
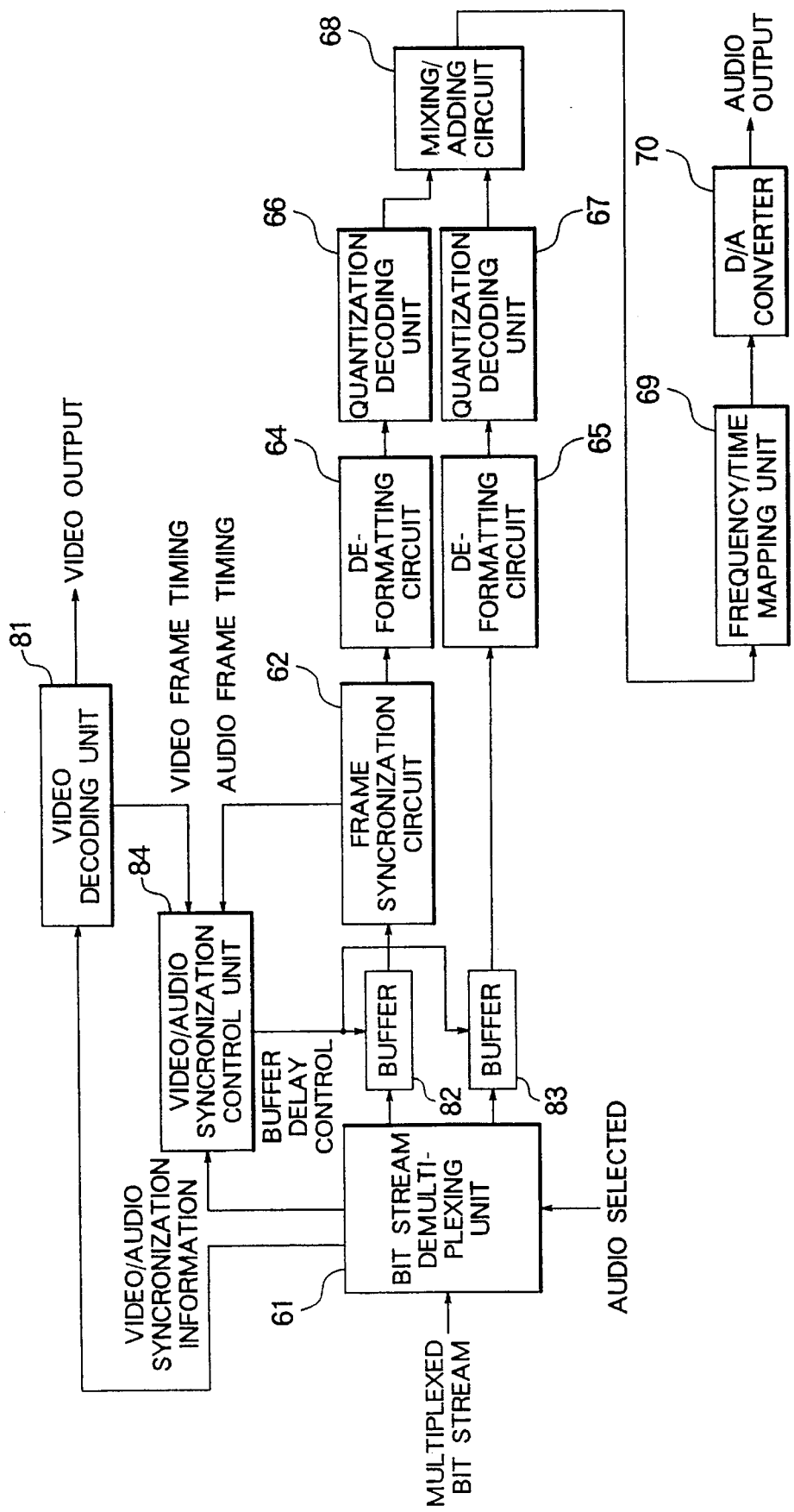
FIG. 8 is a block diagram illustrating a structure of a compressed signal decoding apparatus according to another embodiment of the present invention.

Next, a compressed signal decoding apparatus thereof is described. FIG. 8 is a block diagram illustrating a structure of the compressed signal decoding apparatus. Like reference numerals indicate similar components and parts as in FIG. 2, and a detailed description thereof will be omitted. The bit stream demultiplexing circuit 61 demultiplexes the received multiplexed bit stream to extract the video bit stream, the selected audio bit stream, and the video/audio synchronization information. The video bit stream is supplied to a video decoding unit 81 and is decoded into a video output. The audio bit streams in the individual input lines are supplied to buffers 82 and 83. The audio bit streams in the individual systems are delayed by the buffers 82 and 83 and are supplied to a processing circuit in the subsequent stage (the frame synchronization circuit 62, the de-formatting circuits 64 and 65).

On the other hand, the video/audio synchronization information is supplied to a video/audio synchronization control circuit 84. The video/audio synchronization control circuit 84 calculates a delay amount for each of the buffers 82 and 83 according to the video/audio synchronization information, the video frame timing signal supplied from the video decoding unit 81, and the audio frame timing signal supplied from the frame synchronization circuit 62. More specifically, the video/audio synchronization control circuit 84 controls the delay amounts for the buffers 82 and 83 such that the audio frames of the individual systems are synchronized with the video frames. In this event, the audio bit streams in each system are synchronized with each other, so that one delay amount can be used commonly for the buffers 82 and 83. Accordingly, only one video/audio synchronization control circuit 84 is required for a simple structure.

Figure 9:
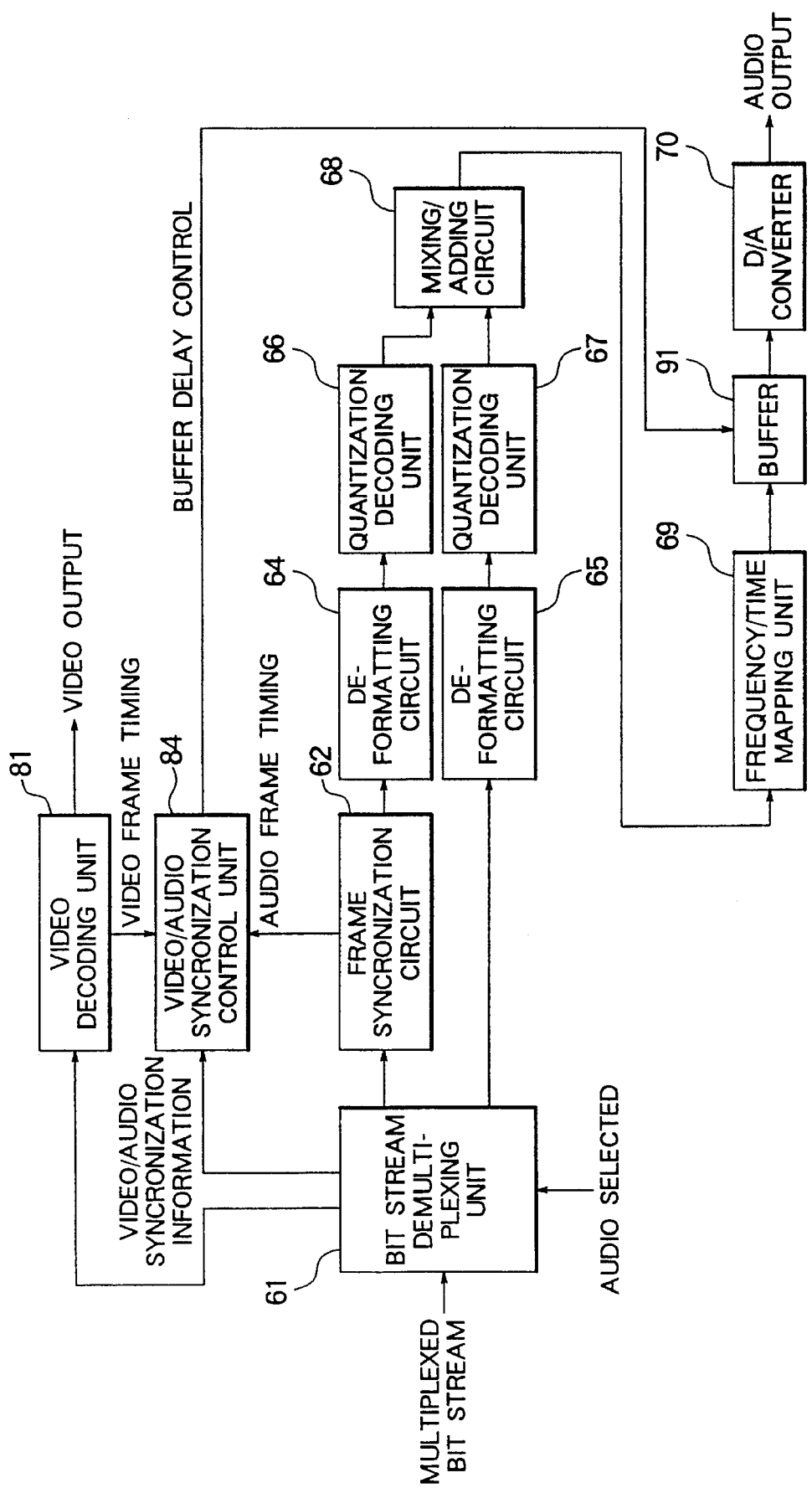
FIG. 9 is a block diagram illustrating another embodiment in which a buffer is displaced in the compressed signal decoding apparatus illustrated in FIG. 8.

While the buffers 82 and 83 are provided at the input for the audio bit stream in this embodiment, only one buffer 91 may be provided at the output for the audio bit stream as shown in FIG. 9 for synchronizing video and audio frames.

Figure 10:
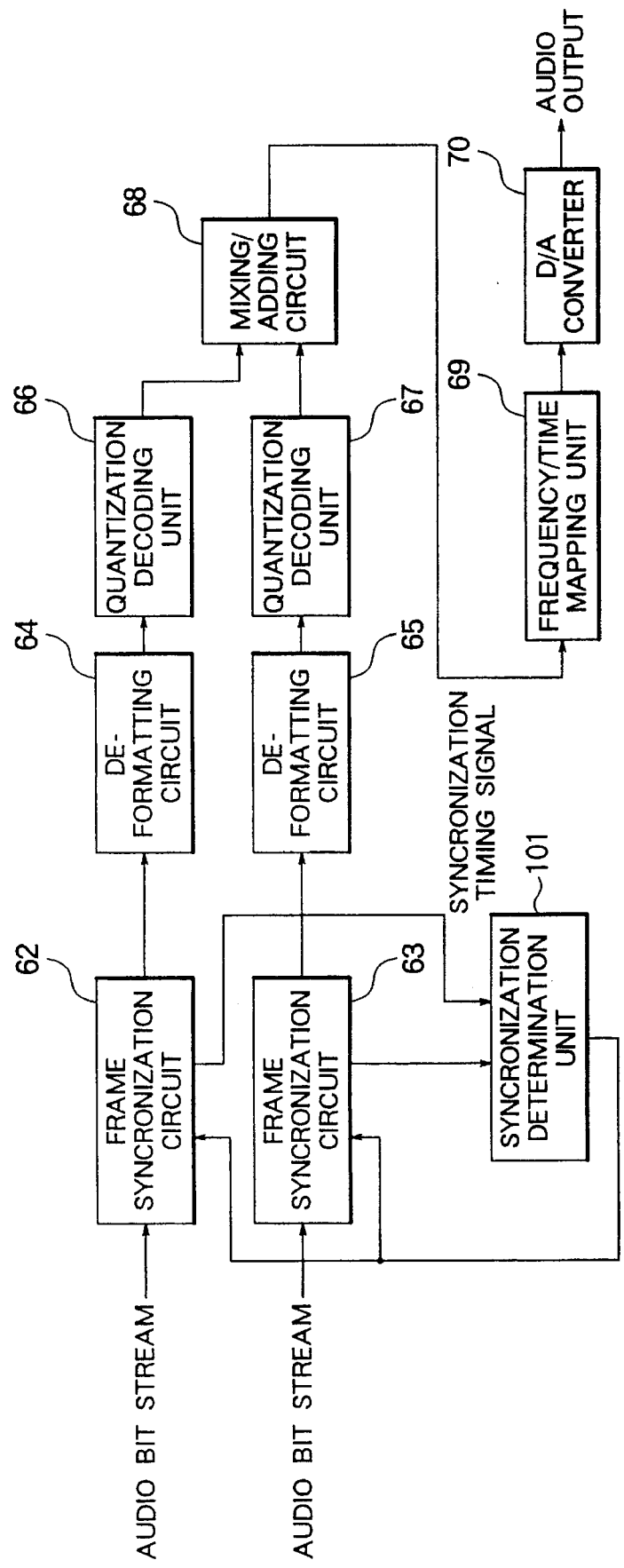
FIG. 10 is a block diagram illustrating a structure of yet another embodiment of the compressed signal decoding apparatus according to the present invention.
Figure 11:
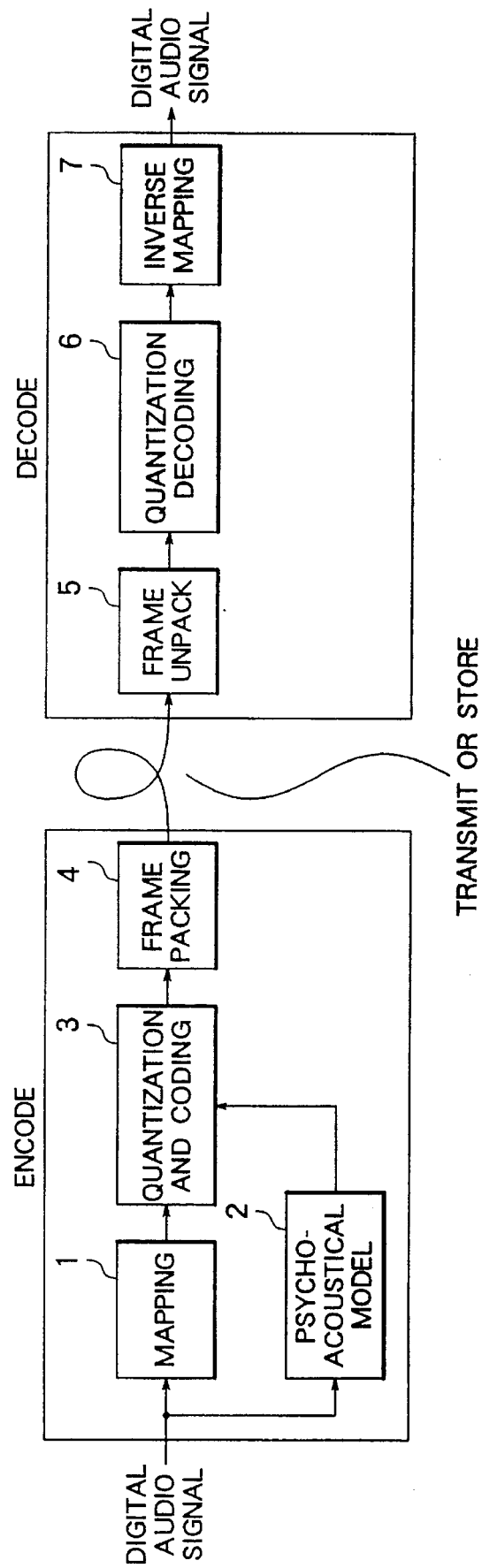
FIG. 11 is a block diagram for use in describing a conventional audio signal compressing and encoding system.
Figure 12:
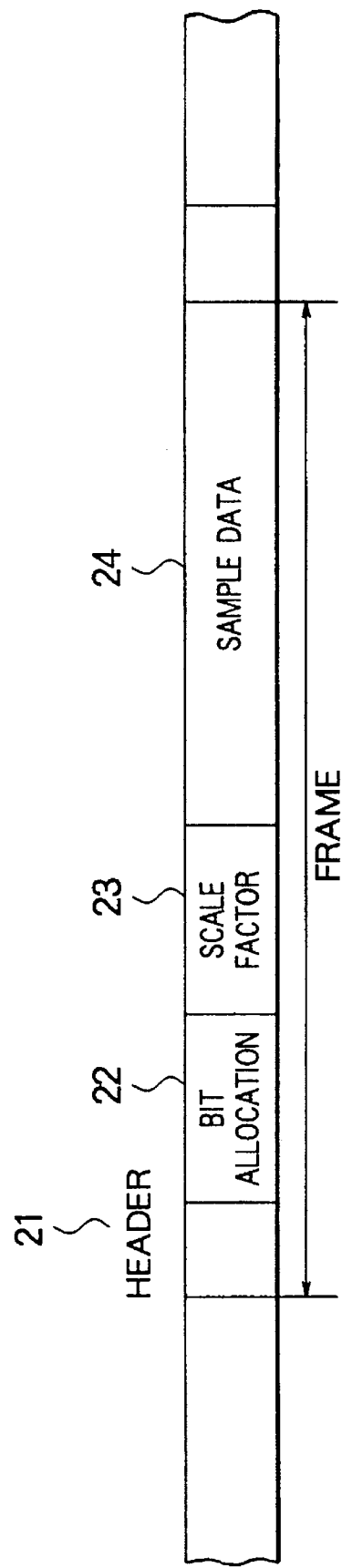
FIG. 12 is a view showing a bit stream.
Figure 13:
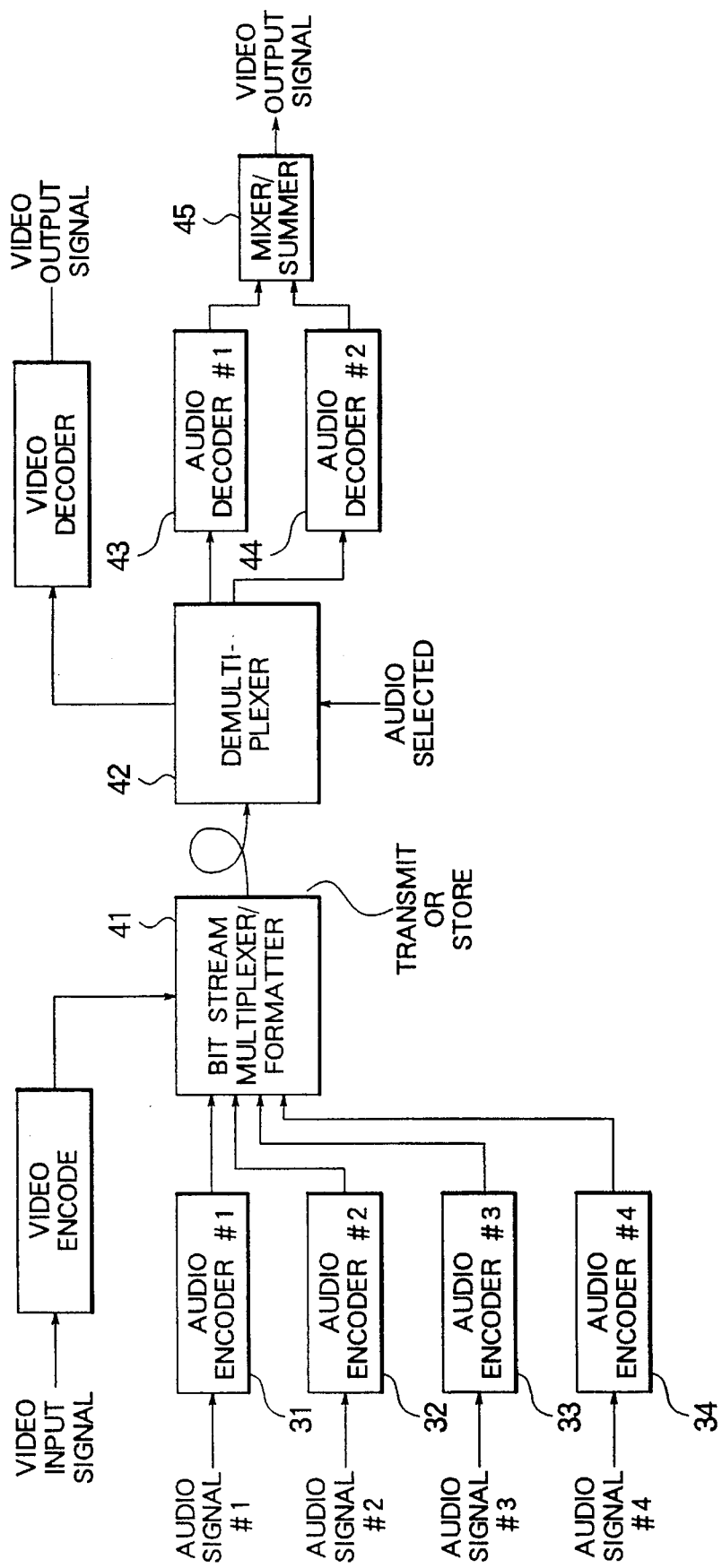
FIG. 13 is a block diagram illustrating a structure of a conventional multi-channel compression system.

Yet another embodiment of the present invention is described. FIG. 10 is a block diagram illustrating a structure of a compressed signal decoding apparatus according to this embodiment. Like reference numerals indicate similar components and parts as in FIG. 2, and a detailed description thereof will be omitted. As shown in the figure, the compressed signal decoding apparatus comprises a synchronization determination unit 101. The synchronization determination unit 101 compares the frame timings detected from the individual audio bit streams to verify that the synchronization is achieved between the audio frames. If the synchronization is not achieved, the synchronization determination unit 101 carries out control to correct this synchronization error. For example, the synchronization determination unit 101 determines a correct synchronization timing by majority operation when the odd number of bit streams are selected. In addition, the synchronization determination unit 101 adjust the synchronization timing of minorities to the timing of the majorities. As a result, the synchronization of the audio bit streams are achieved with higher accuracy.

The present invention can be applied to a case where the sampling frequencies are not equal in production of the bit streams of the audio signals in a plural systems. For example, the one sampling frequency may be one-half of the other as long as the two are in synchronism with each other. In this event, it is necessary to determine or select adequately a length of a time-to-frequency transform relative to the individual audio signals, and to make the position on the frequency axis of the frequency sample sequences of them be associated with each other in an adequate manner. In addition, the sampling frequencies may be in a ratio of, for example, 48 (kHz) to 32 (kHz) as long as they both are in synchronism with each other. In this event, the corresponding frequency samples can be obtained on the frequency axis as shown in FIG. 3 by means of calculating interpolating samples using a known frequency transform technique. The resultant frequency samples can be added on the frequency axis.

In the present invention, the number of the audio bit streams selected in the decoding apparatus not limited to two, and any positive integer can be applied. The number of the audio systems in each bit stream can also be selected arbitrary. The present invention is applicable as long as the mixing down can be achieved between the bit streams upon decoding.

As mentioned above, according to the present invention, the audio signals can be added upon decoding and reproduction in the form of the frequency sample sequences, which otherwise was made in the form of the time sample sequence in conventional arts. This requires only one system for the frequency-to-time transform, resulting in a simplified circuit structure.

In addition, when video and audio are multiplexed, the audio bit streams in the individual input lines are synchronized, so that the only thing required is to produce video/audio synchronization information for a single audio signal of a plurality of input lines. It is thus possible to simplify the circuit structure associated therewith.

What is claimed is:

1. A system for encoding and decoding signals, comprising:
   (a) a signal compressing and encoding apparatus comprising:
      a plurality of A/D converters, each of the converters receiving an audio input signal on an input line and converting the audio input signal into a time sample sequence;
      a plurality of audio encoders, each of the audio encoders transforming one of the time sample sequences, respectively, into a frequency sample sequence, the plurality of audio encoders operating with respect to a common frame clock to synchronize the compressed and encoded frequency sample sequences processed by the plurality of audio encoders; and
      multiplexing means for multiplexing the compressed and encoded frequency sample sequences and outputting a multiplexed bit stream, and
   (b) a compressed signal decoding apparatus comprising:
      separating means for separating selected first bit streams from the multiplexed bit stream;
      decoding means for decoding the first bit streams separated by the separating means into decoded frequency sample sequences;
      adding means for mixing the decoded frequency sample sequences decoded by the decoding means to produce a sum signal; and
      transforming means for transforming the sum signal into decoded time sample sequences, and outputting the decoded time sample sequences.

2. A system for encoding and decoding signals as claimed in claim 1, wherein the decoding means decodes the first bit streams into decoded frequency sample sequences while synchronizing only one first bit stream of the separated first bit streams.

3. A system for encoding and decoding signals as claimed in claim 1, wherein the signal compressing and encoding apparatus further comprises synchronization information generating means for generating synchronization information for use in achieving synchronization between a first compressed and encoded frequency sample sequence and a second bit stream which is different from the compressed and encoded frequency sample sequence, the multiplexing means multiplexing the first compressed and encoded frequency sample sequence, the second bit stream, and the synchronization information to output a multiplexed bit stream, and the separating means separating the first compressed and encoded frequency sample sequence, the second bit stream and the synchronization information selected from the multiplexed bit stream, and the compressed signal decoding apparatus further comprises synchronization controlling means for ensuring synchronization between the first and the second bit streams in accordance with the separated synchronization information.

4. A system for encoding and decoding signals as claimed in claim 3, wherein the synchronization controlling means ensures synchronization between the first and the second bit streams and is positioned so as to receive an output of the separating means and provide an input to the decoding means.

5. A system for encoding and decoding signals as claimed in claim 3, wherein the synchronization controlling means ensures synchronization between the first and the second bit streams after transformation carried out by the transforming means.

6. A system for encoding and decoding signals as claimed in claim 1, further comprising:
   synchronization detecting means for detecting frame synchronization timings for the first bit stream separated by the separating means; and
   controlling means for comparing the detected frame synchronization timings with each other to determine a synchronization error between the first bit streams, the controlling means carrying out control such that the synchronization error is eliminated responsive to detection of the synchronization error.

7. A signal compressing and encoding apparatus for producing a multiplexed bit stream by compressing and encoding input signals of a plurality of input lines, comprising:
   a plurality of A/D converters, each of the converters receiving an audio input signal on one of the plurality of input lines and converting the audio input signal into a time sample sequence;
   a plurality of audio encoders, each of the audio encoders transforming one of the time sample sequences, respectively, into a frequency sample sequence, compressing and encoding the frequency sample sequence with respect to a common frame clock to synchronize between each of the compressed and encoded frequency sample sequences processed by the plurality of audio encoders; and
   multiplexing means for multiplexing the compressed and encoded frequency sample sequences and outputting a multiplexed bit stream.

8. A signal compressing and encoding apparatus as claimed in claim 7, further comprising:
   synchronization information generating means for generating synchronization information for use in achieving synchronization between a first compressed and encoded frequency sample sequence and a second bit stream which is different from the first compressed and encoded frequency sample sequence, wherein the multiplexing means multiplexes the compressed and encoded frequency sample sequence, the second bit stream and the synchronization information to output the multiplexed bit stream.

9. A compressed signal decoding apparatus for decoding a bit stream multiplexed with a plurality of bit streams, each of the bit streams including compressed and encoded frequency sample sequences, each of the encoded frequency sample sequences transformed, compressed and encoded from time sample sequences using a common frame clock to synchronize the compressed and encoded frequency sample sequences, the compressed signal decoding apparatus comprising:

separating means for separating first bit streams from the multiplexed bit stream;

decoding means for decoding the first bit streams separated by the separating means into decoded frequency sample sequences;

adding means for mixing the decoded frequency sample sequences decoded by the decoding means to produce a sum signal; and transforming means for transforming the sum signal into decoded time sample sequences, and outputting the decoded time sample sequences.

10. A compressed signal decoding apparatus as claimed in claim 9, wherein the decoding means decodes the first bit streams into frequency sampled sequences while synchronizing only one first bit stream of the separated first bit streams.

11. A compressed signal decoding apparatus as claimed in claim 9, wherein the separating means separates selected first bit streams, second bit streams which are different from the first bit streams, and synchronization information, and further comprising synchronization controlling means for ensuring synchronization between the first and the second bit streams in accordance with the separated synchronization information.

12. A compressed signal decoding apparatus as claimed in claim 11, wherein the synchronization controlling means ensures synchronization between the first and the second bit streams and is positioned so as to receive an output of the separating means and provide an input to the decoding means.

13. A compressed signal decoding apparatus as claimed in claim 11, wherein the synchronization controlling means ensures synchronization between the first and the second bit streams after the transformation carried out by the transforming means.

14. A compressed signal decoding apparatus as claimed in claim 11, further comprising:

synchronization detecting means for detecting frame synchronization timings for the first bit stream separated by the separating means; and controlling means for comparing the detected frame synchronization timings with each other to determine a synchronization error between the first bit streams, the controlling means carrying out control such that the synchronization error is eliminated responsive to detection of the synchronization error.

15. A method for transmitting a multiplexed bit stream and decoding the transmitted multiplexed bit stream, the multiplexed bit stream produced by comprising, encoding and multiplexing input signals of a plurality of input lines, the method comprising the steps of:

receiving audio input signals on a plurality of input lines and converting the audio input signals into time sample sequences;

transforming each of the time sample sequences into a frequency sample sequence, respectively, and compressing and encoding each transformed frequency sample sequence with respect to a common frame clock to synchronize the compressed and encoded frequency sample sequences;

multiplexing the compressed and encoded frequency sample sequences, and outputting the multiplexed bit stream;

separating selected first bit streams from the multiplexed bit stream;

decoding the separated first bit streams into decoded frequency sample sequences;

adding means for mixing the decoded frequency sample sequences to produce a sum signal;

transforming the sum signal into a decoded time sample sequence, and outputting the decoded time sample sequence.

16. A system for encoding and decoding signals, the system transmitting a multiplexed bit stream and decoding the transmitted multiplexed bit stream, the multiplexed bit stream produced by compressing, encoding and multiplexing audio input signals, the system comprising:

a) a signal compressing and encoding apparatus comprising:

a plurality of analog-to-digital (A/D) converters for sampling the audio input signals at a common sampling clock rate and outputting time sample sequences composed of the sample signals;

a plurality of encoders for transforming the time sample sequences into frequency sample sequences, compressing and encoding the frequency sample sequences at a common frame clock rate to synchronize the compressed and encoded frequency sample sequences and producing an audio bit stream having a predetermined format including the compressed and encoded frequency sample sequences; and a bit stream multiplexing formatter for multiplexing the audio bit streams generated by the plurality of encoders to output the multiplexed bit stream; and (b) a compressed signal decoding apparatus comprising:

a bit stream separating unit for selecting a plurality of the audio bit streams from the multiplexed bit stream;

a plurality of quantization decoding units for decoding the audio bit streams separated by the bit stream multiplexing and separating unit into decoded frequency sample sequences;

an adder for mixing the decoded frequency sampled sequences decoded by the quantization decoding units to produce a sum signal; and a frequency-to-time mapping for transforming the sum signal into decoded time sample sequences, and outputting the decoded time sample sequences.

17. A system for encoding and decoding signals, the system transmitting a multiplexed bit stream and decoding the transmitted multiplexed bit stream, the multiplexed bit stream produced by multiplexing compressed and encoded audio input signals together with video bit streams, the system comprising:

(a) a signal compressing and encoding apparatus comprising:

a plurality of analog-to-digital (A/D) converters for sampling the audio input signals at a common sampling clock rate and outputting time sample sequences;

a plurality of encoders transforming the time sample sequences into frequency sample sequences, compressing and encoding the frequency sample sequences at a common frame clock rate to synchronize the compressed and encoded frequency sample sequences processed by the plurality of encoders, and producing an audio bit stream having a predetermined format including the compressed and encoded frequency sample sequences; and a bit stream multiplexing formatter for multiplexing the audio bit stream generated by the plurality of encoders together with the video bit stream to output the multiplexed bit stream; and (b) a compressed signal decoding apparatus comprising:
a bit stream separating unit for selecting a plurality of audio bit streams from the multiplexed audio bit stream and separating the selected audio bit streams together with video bit streams from the multiplexed bit stream;
a plurality of quantization decoding units for decoding the audio bit streams separated by the bit stream multiplexing and separating unit into decoded frequency sample sequences;
an adder for mixing the decoded frequency sample sequences decoded by the quantization decoding units to produce a sum signal; and
a frequency-to-time mapping unit for transforming the sum signal into decoded time sample sequences, and outputting the decoded time sample sequences.

18. A system for encoding and decoding signals, the system storing a multiplexed bit stream and decoding the stored multiplexed bit stream, the multiplexed bit stream produced by compressing, encoding and multiplexing input signals, the system comprising:

(a) a signal compressing and encoding apparatus comprising:
a plurality of A/D converters, each of the A/D converters receiving an input signal and converting the input signal into a time sample sequence;
a plurality of audio encoders, each of the audio encoders transforming one of the time sample sequences, respectively, into a frequency sample sequence, compressing and encoding the frequency sample sequence at a common frame clock rate to synchronize the compressed and encoded frequency sample sequences processed by the plurality of audio encoders; and
multiplexing means for multiplexing the compressed and encoded frequency sample sequences, and outputting the multiplexed bit stream, and (b) a compressed signal decoding apparatus comprising:
separating means for separating first bit streams from the multiplexed bit stream;
decoding means for decoding the first bit streams separated by the separating means into decoded frequency sample sequences;
adding means for mixing the decoded frequency sample sequences decoded by the decoding means to produce a sum signal; and
transforming means for transforming the sum signal into decoded time sample sequences, and outputting the decoded time sample sequences.

19. A system for encoding and decoding signals as claimed in claim 18, wherein the decoding means decodes the first bit streams into decoded frequency sample sequences while synchronizing only one first bit stream of the separated first bit streams.

20. A system for encoding and decoding signals as claimed in claim 18, wherein the signal compressing and encoding apparatus further comprises synchronization information generating means for generating synchronization information for use in achieving synchronization of the first bit streams with second bit streams which are different from the first bit streams, the multiplexing means multiplexing the compressed and encoded frequency sample sequences, the second bit streams, and the synchronization information to output the multiplexed bit stream, and the separating means separating the first bit streams, second bit streams and synchronization information selected from the multiplexed bit stream, and the compressed signal decoding apparatus further comprises synchronization controlling means for ensuring synchronization between the first and the second bit streams in accordance with the synchronization information.

21. A system for encoding and decoding signals as claimed in claim 20, wherein the synchronization controlling means and is positioned to receive an output of the separating means and provide an input to the decoding means.

22. A system for encoding and decoding signals as claimed in claim 20, wherein the synchronization between the first and the second bit streams after the transformation carried out by the transforming means.

23. A system for encoding and decoding signals as claimed in claim 18, further comprising:
synchronization detecting means for detecting frame synchronization timings for the first bit stream separated by the separating means; and
controlling means for comparing the detected frame synchronization timings with each other to determine a synchronization error between the first bit streams, the controlling means carrying out control such that the synchronization error is eliminated responsive to detection of the synchronization error is caused.

24. A method for storing a multiplexed bit stream and decoding the stored multiplexed bit stream, the multiplexed bit stream produced by compressing, encoding and multiplexing input signals, the method comprising the steps of:
receiving audio input signals on a plurality of input lines and converting the audio input signals into time sample sequences;
transforming each of the time sample sequences into a frequency sample sequence, and compressing and encoding each transformed frequency sample sequence at a common frame clock rate to synchronize each of the compressed and encoded frequency sample sequences;
multiplexing first bit streams including the compressed and encoded frequency sample sequences, and outputting a multiplexed bit stream;
separating selected first bit streams from the multiplexed bit stream;
decoding the separated first bit streams into decoded frequency sample sequences;
adding means for mixing the decoded frequency sample sequences to produce a sum signal; and
transforming the sum signal into a decoded time sample sequence, and outputting the decoded time sample sequence.

25. A system for encoding and decoding signals, the system storing a multiplexed bit stream and decoding the stored multiplexed bit stream, the multiplexed bit stream produced by compressing, encoding and multiplexing audio input signals of a plurality of input lines, and the system comprising:

a) a signal compressing and encoding apparatus comprising:
a plurality of analog-to-digital (A/D) converters for sampling the audio input signals at a common sampling clock rate and outputting time sample sequences composed of the sample signals;

a plurality of encoders for transforming the time sample sequences into frequency sample sequences, compressing and encoding the frequency sample sequences at a common frame clock rate to synchronize the compressed and encoded frequency sample sequences processed by the plurality of encoders, and producing an audio bit stream having a predetermined format including the compressed and encoded frequency sample sequences; and a bit stream multiplexing formatter for multiplexing audio bit streams generated by the plurality of encoders to output the multiplexed bit stream; and b) a compressed signal decoding apparatus comprising:

a bit stream multiplexing and separating unit for selecting a plurality of audio bit streams from the multiplexed bit stream;

a plurality of quantization decoding units for decoding the audio bit streams separated by the bit stream multiplexing and separating unit into decoded frequency sample sequences;

an adder for mixing the decoded frequency sample sequences decoded by the quantization decoding units to produce a sum signal; and a frequency-to-time mapping unit for transforming the sum signal into decoded time sample sequences, and outputting the decoded time sample sequences.

26. A system for encoding and decoding signals, the system storing a multiplexed bit stream and decoding the stored multiplexed bit stream, the multiplexed bit stream produced by multiplexing compressed and encoded audio input signals together with video bit streams, and the system compressing:

(a) a signal compressing and encoding apparatus comprising:

a plurality of analog-to-digital (A/D) converters for sampling the audio input signals at a common sampling clock rate and outputting time sample sequences;

a plurality of encoders for transforming the time sample sequences into frequency sample sequences, compressing and encoding the frequency sample sequences at a common frame clock rate to synchronize the compressed and encoded frequency sample sequences processed by the plurality of encoders, and producing an audio bit stream having a predetermined format including the compressed and encoded frequency sample sequences; and a bit stream multiplexing formatter for multiplexing the audio bit stream generated by the plurality of encoders together with the video bit stream to output the multiplexed bit stream; and b) a compressed signal decoding apparatus comprising:

a bit stream multiplexing and separating unit for selecting a plurality of audio bit streams from the multiplexed bit stream and separating the selected audio bit streams together with video bit streams from the multiplexed bit stream;

a plurality of quantization decoding units for decoding the audio bit streams separated by the bit stream multiplexing and separating unit into decoded frequency sample sequences;

an adder for mixing the decoded frequency sample sequences decoded by the quantization decoding units to produce a sum signal; and a frequency-to-time mapping unit for transforming the sum signal into decoded time sample sequences, and outputting the decoded time sample sequences.

\* \* \* \* \*

UNITED STATES PATENT AND TRADEMARK OFFICE
CERTIFICATE OF CORRECTION

PATENT NO. : 5,619,197
DATED : April 8, 1997
INVENTOR(S) : Shin-ichi NAKAMURA

It is certified that error appears in the above-identified patent and that said Letters Patent is hereby corrected as shown below:

Column 1, line 22, change "received" to --perceived--;

Column 8, line 48, After "with" insert --a--.

Signed and Sealed this

Seventeenth Day of February, 1998

Attest:

BRUCE LEHMAN

*Attesting Officer*     *Commissioner of Patents and Trademarks*